United States Patent [19]

Alberino et al.

[11] Patent Number: 4,552,945
[45] Date of Patent: Nov. 12, 1985

[54] POLYAMIDE-POLYUREA POLYMERS BY THE RIM PROCESS

[75] Inventors: Louis M. Alberino, Cheshire; Dale F. Regelman, Wallingford; Nancy P. Vespoli, Guilford, all of Conn.

[73] Assignee: The Dow Chemical Company, Midland, Mich.

[21] Appl. No.: 683,457

[22] Filed: Dec. 19, 1984

[51] Int. Cl.$^4$ .................. C08G 18/30; C08G 18/32
[52] U.S. Cl. ........................ 528/62; 264/53; 264/54; 264/328.6; 264/DIG. 83; 528/67; 528/73; 528/75; 521/163
[58] Field of Search .................. 528/62, 73, 75; 521/163

[56] References Cited

U.S. PATENT DOCUMENTS

| | | | |
|---|---|---|---|
| 3,314,921 | 4/1967 | Berchtold | 260/77.5 |
| 3,314,922 | 4/1967 | Berchtold | 260/77.5 |
| 4,218,543 | 8/1980 | Weber et al. | 521/51 |
| 4,296,212 | 10/1981 | Ewen et al. | 521/163 |
| 4,374,210 | 2/1983 | Ewen et al. | 521/159 |
| 4,381,352 | 4/1983 | McBrayer | 521/115 |
| 4,433,067 | 2/1983 | Rice et al. | 521/51 |
| 4,444,910 | 4/1984 | Rice et al. | 521/51 |
| 4,448,904 | 5/1984 | Dominguez | 521/160 |
| 4,474,901 | 10/1984 | Dominguez | 521/163 |

OTHER PUBLICATIONS

W. H. Daly, Polymer Preprints, American Chemical Society, Div. of Polymer Chemistry, p. 569, Sep. 1966, 7, No. 2.
W. H. Daly et al., Die Makromoleculare Chemie 103, (1967), pp. 1–17.
Alberino et al., "Organic Coatings and Plastics Chemistry", vol. 44, Preprints American Chemical Society 181st National Meeting, Atlanta, Georgia, Mar. 29–Apr. 3, 1981, pp. 157–163.

Primary Examiner—Herbert S. Cockeram
Attorney, Agent, or Firm—James S. Rose; Michael S. Jenkins

[57] ABSTRACT

Polyamide-polyurea containing polymers are disclosed that are derived from the reaction of (A) an organic polyisocyanate; (B) an organic compound having at least two active hydrogen containing groups; and (C) about 15 to about 160 parts per 100 parts of said (B) of a chain extender combination comprising (i) a particular enamine and (ii) an aromatic diamine and optionally (iii) an extender diol wherein the ratio of equivalents of (A) to total equivalents of (B) and (C) is within the range of about 0.90:1 to 1.10:1.

The polymers find particular utility in the preparation of RIM parts having excellent physical properties. At the same time, the polymers are characterized by slower gel times than prior art aromatic diamine extended polymers thereby allowing the filling of larger molded parts.

21 Claims, No Drawings

POLYAMIDE-POLYUREA POLYMERS BY THE RIM PROCESS

FIELD OF THE INVENTION

This invention relates to polyamide-polyurea containing polymers and is more particularly concerned with polyamide-polyureas having a minor proportion of the residue of an enamine as a recurring unit in the polymer network.

DESCRIPTION OF THE PRIOR ART

Polyurethane-polyurea polymers are well known in the art. U.S. Pat. No. 4,218,543 provides a comprehensive review of the prior art relating to the preparation of polyurethane-polyureas by the RIM processing of organic polyisocyanates, polymeric polyols and various polyamine extenders particularly of the type exemplified by diethyl toluene diamine (DETDA). Improvements in the production of elastomeric polyurethane-polyurea polymers by the RIM technique have been reported in U.S. Pat. Nos. 4,296,212 and 4,374,210 which disclose the use of extender blends of diamines with glycols and the use of isocyanate terminated prepolymers respectively. Additionally, the replacement of the polymeric polyol component by amine terminated polyethers has resulted in polyurea elastomers having improved heat resistance (see U.S. Pat. No. 4,433,067).

The mechanical and thermal properties of the polyurea containing polymers are directly proportional to the concentration of the soft and hard segments which are defined below. Unfortunately, as the diamine concentration is increased the reactivity (as measured by polymer gel time) becomes excessively fast. This increase in speed places a severe limitation on the size of molds which can be properly filled.

Daly (W. H. Daly, Polymer Preprints, American Chemical Soc., Div. of Polymer Chemistry, p. 569, September 1966, Vol. 7, No. 2), and later Daly et al [W. H. Daly and W. Kern, Die Makromoleculare Chemie 103, (1967) pp. 1–17] described the synthesis of polyamides via the reaction of enamines with diisocyanates in in polar solvents at temperatures of at least 60° C.

U.S. Pat. No. 3,314,921 discloses the preparation of polyamides from certain diisocyanates and certain enamines and the formation of either isocyanate or enamine terminated polyamides wherein the isocyanate terminated prepolymer can be reacted with either polyols or other enamines to form finished polymers and the enamine terminated polyamides can be further reacted with isocyanates to complete the polymerization. All of these processes require either heating in organic solvents or else extended periods of curing and/or heating.

U.S. Pat. No. 3,314,922 discloses the curing of isocyanate terminated polyurethane prepolymers with enamines wherein overall reaction times are for extended periods including 48 hours, the shortest reaction time disclosed being 3 minutes.

Alberino et al reported in "Organic Coatings and Plastics Chemistry", Volume 44, Preprints of Papers Presented at the American Chemical Society 181st National Meeting, Atlanta, Ga., Mar. 29–Apr. 3, 1981, pp. 157 to 163, the RIM preparation of certain polyamide-polyurea-polyurethanes via the reaction of a polyol with a diisocyanate, the enamine 1-(N-morpholino)-cyclopentene-1, and a minor proportion of 3,5-diethyl-2,4-diaminotoluene. The resultant products were characterized by poor tensile and impact properties.

It has now been discovered that if a minor proportion of the prior art aromatic amine extenders be replaced by a certain class of enamines, useful high modulus polyamide-polyurea containing polymers can be obtained with increased gel times without any sacrifice in polymer properties. The present class of enamines are distinguished over those employed by Alberino et al cited supra by having much slower reactivities, see comparison Example 4 below. At the same time, the properties of the polymers so obtained are superior to the prior art materials of Alberino et al.

SUMMARY OF THE INVENTION

This invention comprises polyamide-polyurea containing polymers which comprise the product of reaction of, of, A. an organic polyisocyanate;

B. an organic compound having at least two active hydrogen containing groups and a M.W. of about 1500 to about 12,000;

C. from about 15 to about 160 parts per 100 parts of said (B) of a chain extender combination comprising (i) an enamine having the formula (I) [see FORMULA CHART] wherein $C_nH_{2n}$ represents alkylene having 3 carbon atoms in succession in the chain, $R_1$ and $R_2$, when taken separately, are independently selected from the group consisting of lower-alkyl, aralkyl, cycloalkyl, and, when taken together with the nitrogen atom to which they are attached, represent a heterocyclic group having from 5 to 7 ring atoms;

(ii) an aromatic diamine having a molecular weight falling within a range of from about 108 to about 400, wherein (i) and (ii) are present in the proportions by weight based on their combined weight of about 5 to about 45 percent and 95 to 55 percent respectively; and optionally (iii) about 5 to about 50 percent by weight of the total weight of (i), (ii), and (iii) of an extender diol of M.W. of about 60 to about 400;

wherein the ratio of equivalents of said polyisocyanate (A) to total equivalents of components (B), and (C) is within the range of about 0.90:1 to 1.10:1.

The invention also comprises the process of preparing the polyamide-polyurea containing polymers defined above by the reaction injection molding (RIM) method.

The term "alkylene having 3 carbon atoms in the chain" means an alkylene radical having from 3 to 12 carbon atoms, inclusive, such as 1,3-propylene, 1-methyl-1,3-propylene, 2-methyl-1,3-propylene, 1-ethyl-1,3-propylene, 2-isopropyl-1,3-propylene, and the like. The alkylene radical can also be substituted by aryl groups such as 1-phenyl-1,3-propylene, 1,2-diphenyl-1,3-propylene, and the like.

The term "lower alkyl" means alkyl having from 1 to 8 carbon atoms, inclusive, such as methyl, ethyl, propyl, butyl, pentyl, hexyl, heptyl, octyl, and isomeric forms thereof.

The term "aralkyl" means moieties having from 7 to 13 carbon atoms, inclusive, such as benzyl, phenethyl, phenylpropyl, benzhydryl, naphthylmethyl, and the like.

The term "cycloalkyl" means moieties having from 4 to 8 carbon atoms, inclusive, such as cyclobutyl, cyclopentyl, cyclohexyl, cycloheptyl, cyclooctyl, and the like.

The term "heterocyclic group having from 5 to 7 ring atoms" means a heterocyclic radical containing at least the one ring nitrogen atom and optionally containing one or more additional hetero atoms such as nitrogen, oxygen, and sulfur. Illustrative of heterocyclic groups are N-pyrrolidinyl, N-oxazolidinyl, N-thiazolidinyl, N-piperidinyl, N-(4-methylpiperidinyl), N-morpholinyl, N-(4-methylpiperazinyl), N-(4-ethylpiper-azinyl), N-hexahydroazepinyl, and the like.

The term "aromatic diamine" having the M.W. limitation set forth above means an aromatic diamine obtained by replacing two nuclear hydrogen atoms of an aromatic hydrocarbon by —NH$_2$ groups said aromatic hydrocarbon having from 6 to 30 aromatic carbon atoms, inclusive, and is inclusive of the mono-nuclear phenylene, tolylene, naphthylene, and di-nuclear aromatic diamines having the formula (II), wherein X is selected from the group consisting of a single bond, —SO$_2$—,

—O—, and lower-alkylene, and the mono- and di-nuclear aromatic diamines above wherein the benzene nucleus is substituted by any number of inert substituents so long as the above carbon atom limitation is met.

The term "lower alkylene" means alkylene having from 1 to 4 carbon atoms, inclusive, such as methylene, ethylene, propylene, butylene, and isomeric forms thereof.

The term "inert substituent" means any radical which does not react with amino, isocyanate, or hydroxyl groups, and which does not otherwise interfere with the formation of said polyamide-polyurea containing polymers, and is inclusive of lower-alkyl defined above, halo, i.e. chloro, bromo, fluoro, and iodo; lower-alkoxy, i.e. alkoxy from 1 to 8 carbon atoms, inclusive, such as methoxy, ethoxy, propoxy, butoxy, pentyloxy, hexyloxy, heptyloxy, octyloxy, and the like, including isomeric forms thereof; lower-alkylmercapto, i.e. alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

DETAILED DESCRIPTION OF THE INVENTION

The preparation of the polyamide-polyurea containing polymers of the invention can be carried out using any of the conventional techniques known by those skilled in the art for preparing polyurethane type polymers. This includes their preparation for use in spray applications, casting, and molding applications, in which the components are dispensed using high pressure mixing equipment either in a one-shot or a prepolymer process. The present polymers are particularly suited for preparation via the RIM method. For illustrative and detailed teaching in respect of RIM methods including reactants and molding procedures reference is made to the U.S. Pat. Nos. 4,218,543, 4,296,212, 4,374,210, and 4,433,067 cited supra, whose disclosures relative thereto are incorporated herein by reference.

The novelty in the present invention resides in the replacement of a minor proportion of the diamine extender (hard segment former) of the prior art with an enamine (also a hard segment former) to provide for the particular extender combination (i) and (ii) defined above.

The terms "soft and hard segments" refer to the linkages derived from the polyisocyanate component with the high M.W. organic compound (B) and with the extender combination (C) respectively. Linkages derived from any additional extender with polyisocyanate fall into the hard segment category.

The proportions of hard segments in the present polymers are controlled by the proportions of extender (C) employed and as defined above. Preferably, from about 30 to about 160 parts of said combination (C) per 100 parts of said (B) are employed and the preferable proportions of said enamine (i) and diamine (ii) are about 10 to about 30 percent and 90 to 70 percent by weight, respectively.

Conveniently, the enamine behaves as a difunctional ingredient reacting with two isocyanate groups in forming two amide linkages shown schematically in the Reaction Chart. That is to say, the equivalent weight of the enamine (I) is half the molecular weight.

The enamines (I) defined above are well known in the chemical art and are readily prepared by reacting the appropriate secondary amine with cyclohexanone, or the appropriately substituted cyclic ketones wherein the substituents are located anywhere on the rings except on either one of the carbon atoms adjacent to the carbonyl groups. Typical substituents for the cyclic ketones are lower-alkyl groups. For detailed methods for the preparation of the enamines see G. Stork et al, J. American Chem. Soc. 85 (1963) p. 207.

Preferred amongst the classes of (I) defined above are those wherein R$_1$ and R$_2$ are both the same and are lower-alkyl defined above and those wherein R$_1$ and R$_2$ are taken together with the nitrogen atom to which they are attached to form a heterocyclic group having from 5 to 7 ring atoms defined above. Also preferred are those enamines wherein the alkylene chain is 1,3-propylene.

Illustrative but not limiting of the enamines (I) are 1-(dimethylamino)cyclohexene-1, 1-(diethylamino)cyclohexene-1, 1-(dipropylamino)cyclohexene-1, 1-(dibutylamino)cyclohexene-1, 1-(dipentylamino)cyclohexene-1, 1-(dihexylamino)cyclohexene-1, 1-(diheptylamino)cyclohexene-1, 1-(dioctylamino)cyclohexene-1, 1-(methylethylamino)cyclohexene-1, 1-(diisopropylamino)cyclohexene-1, 1-(diisobutylamino)cyclohexene-1, 1-(methylbutylamino)-cyclohexene-1, and the like; 1-(dibenzylamino)cyclohexene-1, 1-(diphenethylamino)cyclohexene-1, 1-(dinaphthylmethylamino)-cyclohexene-1, and the like; 1-(dicyclobutylamino)cyclohexene-1, 1-(dicyclopentylamino)cyclohexene-1, 1-(dicyclohexylamino)cyclohexene-1, 1-(dicycloheptylamino)cyclohexene-1, 1-(dicyclooctylamino)cyclohexene-1, 1-(cyclopentylcyclohexylamino)cyclohexene-1, and the like; 1-(N-pyrrolidinyl)cyclohexene-1, 1-(N-oxazolidinyl)cyclohexene-1, 1-(N-thiazolidinyl)-cyclohexene-1, 1-(N-piperidinyl)cyclohexene-1, 1-(N-methylpiperidinyl)cyclohexene-1, 1-(N-morpholinyl)-cyclohexene-1, 1-[N-(4-ethylpiperazinyl)]cyclohexene-1, 1-(N-hexahydroazepinyl)cyclohexene-1, and the like; 1-(N-morpholinyl)-3-methylcyclohexene-1, 1-(N-morpholinyl)-4-methylcyclohexene-1, 1-(N-morpholinyl)-3-ethylcyclohexene-1, 1-(N-morpholinyl)-4-isopropylcyclohexene-1, 1-(dibutylamino)-3,4-diphenylcyclohexene-1, and the like.

Preferred enamines of those illustratively disclosed above are the cyclohexene-1 compounds having the symmetrical dialkylamino and heterocyclic amino substitutions.

Illustrative but not limiting of the aromatic diamines defined above are, m-phenylenediamine, p-phenylenediamine, 2,4-tolylenediamine, 2,6-tolylenediamine, and mixtures of the 2,4- and 2,6-tolylenediamine, 1,5-naphthylenediamine, 4,4'-diaminobiphenyl, 4,4'-diaminodiphenylether, 4,4'-diaminodiphenylsulfone, 2,2-(4,4'-diaminodiphenyl)propane, 4,4'-diaminobenzophenone, 4,4'-diaminodiphenylmethane, 3,3'-dimethyl-4,4'-diaminodiphenylmethane, 3,3'-diaminodiphenylmethane, methylenebis-o-chloroaniline (MOCA), and the like; 1,3-dimethyl-2,4-diaminobenzene, 1,3-diethyl-2, 4-diaminobenzene, 1,3-dimethyl-2,6-diaminobenzene, 1,4-diethyl-2,5-diaminobenzene, 1,4-diisopropyl-2 5-diaminobenzene, 1,4-dibutyl-2,5-diaminobenzene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene (and mixtures of the latter two diamines in varying proportions), and the like; 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, and the like; 3,3',5,5'-tetramethyl-benzidine, 3,3',5,5'-tetraisopropyl-benzidine, and the like; 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2', 4-diaminodiphenylmethane, 3,5-diisopropyl-3'-methyl-2', 4-diaminodiphenylmethane, 3,3'-diethyl-2,2'-diaminodiphenylmethane, and the like; 3,3',5,5'-tetraethyl-4,4'-diaminobenzophenone, 3,3',5,5'-tetraisopropyl-4,4'-diaminobenzophenone; 3,3', 5,5'-tetraethyl-4,4'-diaminodiphenyl ether, 3,3'-5,5'-tetraisopropyl-4,4'-diaminodiphenyl ether; 3,3'-5,5'-tetraisopropyl-4,4'-diaminodiphenyl sulfone, and the like; and the products obtained by condensing a substituted aniline of the formula (III) or a mixture of two or more such substituted anilines, with formaldehyde under acid conditions to obtain substituted diaminodiphenylmethanes having the formula (IV) wherein $R_3$ and $R_5$ are selected from hydrogen and lower-alkyl and $R_4$ and $R_6$ are lower-alkyl. If one uses only a single substituted aniline (III) to prepare (IV) the groups $R_3$ and $R_5$ will be identical and so will $R_4$ and $R_6$. If one uses two differently substituted anilines in the above reaction the product will be a mixture of a number of different methylenedi(anilines) all conforming to the formula (IV).

Preferred amongst the diamines set forth above are 1-methyl-3,5-diethyl-2,4-diaminobenzene, 1-methyl-3,5-diethyl-2,6-diaminobenzene, and mixtures thereof in varying proportions, and the diamines defined by formula (IV).

While the primary difunctional extender combination comprises the enamine (i) and diamine (ii), in an optional embodiment of the present invention, an extender diol (iii) of M.W. of about 60 to about 400 can be employed. In fact, when polymers of the highest moduli and hardness are desired the addition of the diol extender is desirable. The proportion of diol to be employed falls within the range of about 5 to about 50 percent by weight of the total weight of (i), (ii) and (iii) with the total proportions of the combination (C) still falling within the ranges set forth above. Preferably, the diol content is from about 10 to about 40 percent by weight.

Illustratively, the extender diols are ethylene glycol, 1,4-butanediol, 1,6-hexanediol, diethylene glycol, polyethylene glycol M.W. about 200, and the like.

The polyisocyanates to be used in accordance with the present invention can be any of the organic di- or higher functionality polyisocyanates known to those skilled in the polyurethane art and include those polyisocyanates disclosed in the patents incorporated herein by reference. The preferred class of polyisocyanates are the aromatic polyisocyanates.

Illustrative, but not limiting thereof, are m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 20 percent of the 2,4'-isomer) of 4,4'-methylenebis-(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of M.W. 1000 to 10,000, polytetramethylene glycols of M.W. 600 to 5000, and polyester polyols of M.W. 500 to 8000, said polyol and said methylenebis-(phenyl isocyanate) being reacted in the proportions of about 0.01 equivalent to about 0.5 equivalent of said polyol per isocyanate equivalent in accordance with U.S. Pat. No. 4,374,210 whose disclosure is already incorporated herein; also falling within the preferred group of polyisocyanates are blends or mixtures of any of the above polyisocyanates and particularly mixtures of the liquefied methylenebis(phenyl isocyanates) with each other and with the isocyanate terminated prepolymers described above in any proportions desired.

The organic compounds (B) having at least 2 active hydrogen groups and a molecular weight from about 1500 to about 12,000 include the polymeric polyols and polymeric polyamines disclosed in the patents cited supra and incorporated herein by reference.

It will be obvious to one skilled in the art that when polyols are employed the resulting molded polymers contain polyurethane linkages along with the polyurea and polyamide linkages arising from the diamine extender and enamine respectively. In the event that the polyamines are the ingredients chosen then the elastomer would contain primarily polyurea linkages derived both from the polymeric polyamine and the diamine extender along with the polyamide linkages. The present process also includes the use of mixtures of the polyols with the polyamines.

In respect of the polymeric polyol component, the functionality is, generally speaking, from about 2 to about 4 with the hydroxyl functionality predominantly primary. Preferably, the polyols have functionality of about 2 to about 3 and M.W. from about 2000 to about 8000.

A preferred group of polyols comprises the poly-propyleneoxy-polyethyleneoxy capped diols and triols obtained by the alkoxylation of water, ammonia, ethylene glycol, propylene glycol, trimethylolpropane, glycerine, aniline, ethanolamine, and the like; polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols or copolymers thereof; and the vinyl-resin reinforced propyleneoxyethyleneoxy capped diols and triols, particularly those polyethers reinforced with polyacrylonitrile.

In respect of the polymeric polyamine component, the functionality is, generally speaking, from about 2 to about 4 of primary and/or secondary amine terminated polymers, preferably primary amine terminated polyethers. Preferably, the primary amine terminated polyethers have a functionality of about 2 to about 3 and M.W. from about 2000 to about 6000.

The preferred group of polyamines are the predominantly primary amine terminated polyethyleneoxypolypropyleneoxy polyethers having the preferred M.W. and functionality range set forth above.

It will be evident to those skilled in the art that the present polymers and methods comprehend the use of prepolymer technology wherein the above isocyanate reactive components, particularly the organic polyols, can be prereacted in minor amounts with excess isocyanate prior to the final polymer forming step.

The proportions of polyisocyanate (A) to the total active hydrogen equivalents comprised of (B) and (C), are such that the ratio of isocyanate equivalents to the total active hydrogen equivalents falls within a range of from about 0.90:1 to about 1.10:1, preferably from about 0.95:1 to about 1.05:1.

Optionally, a polyurethane catalyst for the reaction of isocyanate groups with the reactive hydrogen containing compounds can be employed. Any of the catalysts disclosed in the art supra can be employed in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

Generally speaking, the catalyst or mixture of catalysts, if employed, will fall within a range of from about 0.01 percent by weight to about 5 percent by weight based on the total weight of all the ingredients.

Optionally, blowing agents may be employed wherein compact tough skinned surfaces are desired. Any of the blowing agents known in the art can be used such as fluorocarbon blowing agents. Also, inert gases (e.g. nitrogen, argon, and the like) may be introduced to provide whatever degree of blowing is desired from micro-cellular to macro-cellular in nature.

Other optional additives such as dispersing agents, cell stabilizers, surfactants, internal mold release agents, flame retardants, colorants, reinforcing agents, fiber glass, and the like can be added to the ingredients in accordance with the present invention.

The polymers produced in accordance with the present invention are possessed of the combination of excellent physical properties such as high tensile strength, hardness heat resistance, high flex modulus, good impact strength, and the like.

Generally speaking, the polymers are characterized by a flexural modulus of at least 70,000 psi when measured at ambient temperature (about 20° C.) in accordance with the ASTM Test Method D-790.

The surprising feature of the present polymers is their retention of the excellent physical properties which characterize molded polyurea polymers but at considerably slower gel times. This feature allows for the molding of larger parts without property losses. Additionally, the hard segment content can be increased to higher levels compared with the prior art which leads to increased heat resistant properties.

Accordingly, the present polymers are useful for the preparation of solid cast elastomers, solid and microcellular RIM elastomers, and elastoplastics, all within a Shore D hardness range of from about 30 to about 80. The molded products find particular utility as auto parts such as car bumpers, body elements, panels, doors, engine hoods, skirts, air scoops, and the like. The high heat resistance of the molded parts allows for them to be painted on-line in an automotive assembly application The following examples describe the manner and process of making and using the invention and set forth the best mode contemplated by the inventors of carrying out the invention but are not to be construed as limiting.

EXAMPLE 1

The following experiment describes the RIM preparation of a series of polyamide-polyurea containing polymers (runs 1 through 6) in accordance with this invention. A pilot plant scale RIM machine was employed along with the ingredients in the proportions in parts by weight set forth in Table I.

One tank of the RIM machine was charged with the A component (at about 100° F.) while a second tank was charged with the B component (about 100° F.). Metering pumps from each tank were used to deliver the ingredients into the impingement mixing head of the RIM machine. After mixing, the reaction mixture was directed into a metal mold measuring 10 inches × 8 inches × ⅛ inch. The mold temperature ranged from 150° F. to 300° F. and molded parts were postcured for 1 hour at the temperatures noted.

Runs 1 through 5 represent polyamide-polyurea-polyurethanes wherein the enamine content in the diamine-enamine extender combination was varied between 7 and 28 percent by weight. Run 6 was a polyamide-polyurea wherein the enamine was employed at about 10 percent by weight of the extender combination.

The gel times as noted in Table I (runs 2, 4, 5, and 6) were considerably increased when compared with the gel times (shown in parentheses) of the same formulations run without the enamine but at the same index of reactants. However, excellent physical properties of the molded parts were maintained notwithstanding the differences in reactivity rates.

temperatures being 95° F. and 102° F. respectively, mold temperature of 370° F., and demold time of 1 minute.

TABLE I

| Run | 1 | 2 | 3 | 4 | 5 | 6 |
|---|---|---|---|---|---|---|
| Ingredients (parts by wt.) | | | | | | |
| Component A: | | | | | | |
| Isocyanate I[1] | 135 | 82.2 | — | — | — | 38 |
| Isocyanate II[2] | — | — | 69.4 | — | — | — |
| Isocyanate III[3] | — | — | — | 112.6 | 116.2 | — |
| Isocyanate IV[4] | — | — | — | — | — | 58 |
| Component B: | | | | | | |
| SF 6503[5] | 100 | 100 | 100 | 100 | 100 | — |
| Jeffamine T-5000[6] | — | — | — | — | — | 100 |
| DETDA[7] | 54 | 30.8 | 30 | 33 | 33 | 38 |
| 1-(dibutylamino)-cyclohexene-1 (% by wt of extender) | 6 (10%) | 6 (16%) | 11.8 (28%) | 2.5 (7%) | 4 (11%) | 4.22 (10%) |
| UL-28[8] | 0.4 | 0.05 | 0.05* | 0.2 | 0.2 | — |
| NCO/OH Index | 1.03 | 1.0 | 1.0 | 1.0 | 1.0 | 1.0 |
| % Hard segment | 64 | 51.6 | 50 | 42 | 42 | 50 |
| Gel time, sec. (without enamine) | 2 | 3.8 (2) | — | 3.5 (3.0) | 4 (3) | 2.8 (2.3) |
| Mold Temp. (°F.) | 300 | 150 | 150 | 150 | 150 | 260 |
| Demold Time (mins.:secs.) | 2:00 | 2:00 | 2:00 | 2:00 | 2:00 | 0:30 |
| Postcure (1 hr.) | 320° F. | 250° F. | 250° F. | 250° F. | 250° F. | 300° F. |
| Properties | | | | | | |
| Density, g/cc | 1.141 | 1.135 | 1.04 | 1.118 | 1.124 | 1.065 |
| Hardness Shore D | 71 | 70 | 58 | 61 | 59 | 58 |
| Tensile str., psi | 5600 | 2700 | 3113 | 4675 | 4163 | 3857 |
| % Elongation | 110 | 288 | 313 | 320 | 303 | 120 |
| Flex. Modulus, psi | 142,600 | 71,490 | 33,620 | 50,850 | 48,070 | 47,200 |
| Flex. Strength, psi | 6640 | 3670 | 1660 | 2504 | 2489 | 2360 |
| HDT[9] @ 264 psi, °C. | 156° C. | — | — | — | — | 66° C. |
| Notched Izod Impact, ft.-lbs./in.(at 20° C.) | 5.46 | — | — | — | — | 4.23 |

*Dibutyltin dilaurate was used instead of UL-28.
Footnotes to TABLE I
[1]Isocyanate I: is a liquefied methylenebis(phenyl isocyanate) prepared from 4,4'-methylenebis(phenyl isocyanate) and a mixture of a minor amount of dipropylene glycol and tripropylene glycol (equal parts by weight) wherein the total hydroxyl equivalents was about 0.2 per equivalent of MDI; I.E. = 181.
[2]Isocyanate II: is a liquefied form of 4,4'-methylenebis(phenyl isocyanate) in which a portion of the isocyanate groups have been converted to carbodiimide; I.E. = 143.
[3]Isocyanate III: is a blend of (1) about 10 parts by wt. of Isocyanate II (defined above); and (2) an isocyanate terminated prepolymer prepared from the reaction of about 53 parts of 4,4'-methylenebis-(phenyl isocyanate) with about 6 parts of a 50/50 (by wt.) mixture of dipropylene glycol and tripropylene glycol and about 31 parts of a 4000 M.W. polypropyleneoxy-polyethyleneoxy diol having about 24% by wt. E.O. content and about 83% primary hydroxyl groups with an OH E.W. = about 1700; I.E. of the blend = about 250.
[4]Isocyanate IV: is a blend of (1) about 53 parts by wt. of Isocyanate II (defined above); and (2) an isocyanate terminated prepolymer prepared from the reaction of about 25 parts of a methylenebis(phenyl isocyanate) [comprising about 89% of the 4,4'-isomer and 11% of the 2,4'-isomer] and 22 parts of a 5000 M.W. polypropyleneoxy-polyethyleneoxy triol having about 18 to about 19 percent by wt. E.O. content and about 85% primary hydroxyl groups, with OH E.W. = about 1626; isocyanate equiv. wt. of the blend = 180.
[5]SF 6503: a 6000 M.W. polypropyleneoxy-polyethyleneoxy triol, OH E.W. = 2100 (supplied by Texaco Chemical Co.).
[6]Jeffamine T-5000: is a polypropyleneoxy polyamine of about 5000 M.W. and having about three primary amine groups.
[7]DETDA: a mixture of 80/20 percent by weight of 1-methyl-3,5-diethyl-2,4-diaminobenzene and 1-methyl-3,5-diethyl-2,6-diaminobenzene respectively.
[8]UL-28: a tin catalyst which is a dibutyltin dialcoholate (supplied by Witco Chemical Corp.)
[9]Heat deflection temperature is determined in accordance with ASTM Test Method D648.

EXAMPLE 2

Using the same apparatus and procedure described in Example 1 but with the ingredients in the proportions of parts by weight set forth in Table II below there were prepared three polyamide-polyurea-polyurethane polymers in accordance with the present invention (runs 7 to 9).

These polymers all had hard segment contents of about 72 percent which signifies their high flex modulus properties. The enamine content of the extender combination was only 15 percent by weight in all three and the formulations ranged in NCO/OH index from 0.95 to 1.05. Processing conditions were essentially identical in all three cases with component A and component B Gel times measured within experimental error for the three formulations at 1.8 to 2.0 seconds. A comparable formulation at the same index of reactants but without the enamine (i.e. an equivalent amount of DETDA replacing the removed enamine) had a gel time of less than 1.3 seconds. This represents almost a 40 percent increase in gel time over the formulation lacking the enamine.

The molded plaques were examined in pairs, one receiving no postcure treatment while the second was subjected to a cure step of 375° F. for 30 minutes.

The comparison of the properties of the cured samples with their uncured counterparts showed that the curing step while providing for some slight improvement in properties was not essential. That is to say, molded parts having excellent properties were obtained upon demold without the need for curing. Just as important is the fact that the excellent high modulus materials were obtained at longer gel times than the formulations containing only the DETDA extender.

90° F. and 104° F. respectively. The mold temperature was 330° F. and the samples could be demolded in 30 seconds.

Runs 10 and 11 were handled similarly to Example 2 wherein the molded samples were examined in pairs, one receiving no postcure while the second was subjected to a cure step of 325° F. for 1 hour. The physical

TABLE II

| | Run 7 | | Run 8 | | Run 9 | |
|---|---|---|---|---|---|---|
| | No postcure | 375° F. 30 min. | No* postcure | 375° F.* 30 min. | No postcure | 375° F. 30 min. |
| Ingredients (parts by wt.) | | | | | | |
| Component A: | | | | | | |
| Isocyanate I[1] | 100 | 100 | 106 | 106 | 109 | 109 |
| Isocyanate IV[2] | 150 | 150 | 159 | 159 | 164 | 164 |
| Component B: | | | | | | |
| Fomrez A-1228[3] | 100 | 100 | 100 | 100 | 100 | 100 |
| DETDA | 108 | 108 | 108 | 108 | 108 | 108 |
| 1-(dibutylamino)-cyclohexene-1 | 18.9 | 18.9 | 18.9 | 18.9 | 18.9 | 18.9 |
| UL-28 | 0.8 | 0.8 | 0.8 | 0.8 | 0.8 | 0.8 |
| NCO/OH Index | 0.95 | 0.95 | 1.0 | 1.0 | 1.05 | 1.05 |
| A/B Ratio | 1.1 | 1.1 | 1.16 | 1.16 | 1.2 | 1.2 |
| Properties | | | | | | |
| Density, g/cc | 1.125 | 1.13 | 1.12 | 1.15 | 1.075 | 1.125 |
| Hardness Shore D | 75 | 75 | 73 | 75 | 74 | 77 |
| Tensile str., psi | 5854 | 6263 | 6210 | 6513 | 5554 | 6452 |
| % Elongation | 5 | 10 | 10 | 15 | 10 | 5 |
| Flex. Modulus (68° F.), psi | 188,300 | 200,100 | 199,200 | 205,800 | 188,400 | 200,600 |
| Flex. Modulus (158° F.), psi | — | — | 157,200 | 161,800 | — | — |
| Flex. Modulus (−20° F.), psi | — | — | 286,800 | 259,600 | — | — |
| Flex. str. (68° F.), psi | 9629 | 10,021 | 9572 | 10,807 | 8852 | 10,287 |
| Flex str. (158° F.), psi | — | — | 7680 | 8730 | — | — |
| Flex. str. (−20° F.), psi | — | — | 14,870 | 14,710 | — | — |
| Heat Sag 325° F./30 min.[4] | −0.04" | 0.035" | −0.03" | −0.01" | −0.095" | −0.06" |
| Heat Sag 325° F./1 hr. | 0.043" | 0.075" | 0.03" | 0.037" | 0.053" | 0.037" |
| Notched Izod Impact ft.-lbs./in. | | | | | | |
| 68° F. | 1.89 | 1.95 | 2.20 | 2.39 | 1.85 | 2.47 |
| −20° F. | — | — | 1.40 | 1.76 | — | — |
| HDT @ 264 psi, °C. | — | — | 188° C. | — | — | — |

*The properties reported for both run 8 polymers were not all determined from the same molded sample but were compiled from three separate moldings of each run.
Footnotes to TABLE II
[1]Isocyanate I: defined in footnote 1, TABLE I.
[2]Isocyanate IV: defined in footnote 4, TABLE I.
[3]Fomrez A-1228: a 6000 M.W. polypropyleneoxy-polyethyleneoxy triol; OH E.W. = about 2000 (supplied by Witco Chemical Co.)
[4]Heat sag is determined by measuring the amount in inches, that a 1 inch wide sample (about ⅛ inch thick) with a 6" unsupported overhang droops under its own weight when held at one end in a horizontal position under the specified conditions of time and temperature

EXAMPLE 3

Using the same apparatus and procedure described in Example 1 but with the ingredients in the proportions of parts by weight set forth in Table III below there were prepared three polyamide-polyurea-polyurethane polymers in accordance with the present invention (runs 10 to 12).

These polymers all had very high hard segment contents of about 77.8 percent with correspondingly high flex modulus properties. In these polymers the extender combination contained about 19 percent by weight of ethylene glycol. The NCO/OH index ranged from 0.95 to 1.05. Processing conditions were essentially identical in all three runs. A and B component temperatures were properties of Run 12 were determined only on the cured sample.

Gel times of these formulations at this level of enamine were just under one second. Comparatively, runs 7 to 9 of Example 2 at the same enamine level but without the ethylene glycol component were much slower. An increase in enamine level would slow the gel time accordingly.

Similarly, to the results of Example 2, excellent physical properties were observed for the molded parts without the need for a curing step. The incorporation of the glycol in the extender combination gives rise to improved elongation and impact strength over those parts prepared in its absence (c.f. runs 7 to 9).

TABLE III

| | Run 10 No postcure | Run 10 325° F. 1 hr. | Run 11 No postcure | Run 11 325° F.* 1 hr. | Run 12 325° F.* 1 hr. |
|---|---|---|---|---|---|
| Ingredients (parts by wt.) | | | | | |
| Component A: | | | | | |
| Isocyanate I[1] | 165 | 165 | 175 | 175 | 186 |
| Isocyanate IV[2] | 247 | 247 | 263 | 263 | 278 |
| Component B: | | | | | |
| Fomrez A-1228 | 100 | 100 | 100 | 100 | 100 |
| DETDA | 108 | 108 | 108 | 108 | 108 |
| 1-(dibutylamino)-cyclohexene-1 | 18.9 | 18.9 | 18.9 | 18.9 | 18.9 |
| Ethylene Glycol | 30 | 30 | 30 | 30 | 30 |
| UL-28 | 0.8 | 0.8 | 0.8 | 0.8 | 0.8 |
| NCO/OH Index | 0.95 | 0.95 | 1.0 | 1.0 | 1.05 |
| A/B Ratio | 1.6 | 1.6 | 1.7 | 1.7 | 1.8 |
| Properties | | | | | |
| Density, g/cc | 1.16 | 1.114 | 1.18 | 1.18 | 1.195 |
| Hardness Shore D | 77 | 76 | 76 | 77 | 78 |
| Tensile str., psi | 6743 | 6447 | 7159 | 7184 | 7352 |
| % Elongation | 30% | 10% | 25% | 25% | 20% |
| Flex. Modulus (68° F.) psi | 179,600 | 236,200 | 237,900 | 240,900 | 233,000 |
| Flex. Modulus (158° F.) psi | — | — | — | 162,500 | — |
| Flex. Modulus (−20° F.) psi | — | — | — | 281,000 | — |
| Flex. Str., (68° F.) psi | 11,348 | 11,864 | 11,042 | 11,400 | 12,644 |
| Flex. Str., (158° F.) psi | — | — | — | 8,310 | — |
| Flex. Str., (−20° F.) psi | — | — | — | 16,100 | — |
| Heat Sag 325° F./30 min.[3] | — | — | −0.28 | −0.165 | 0.18 |
| Heat Sag 325° F./1 hr. | 0.53 | 0.065 | 0.305 | 0.105 | — |
| HDT @ 264 psi °C. | — | — | — | 145° C. | — |
| Notched Izod Impact ft.-lbs./in. | | | | | |
| 68° F. | 4.08 | 5.25 | 4.45 | 5.45 | 3.99 |
| −20° F. | — | — | — | 3.80 | — |

*The properties reported for the postcured runs 11 and 12 were not all determined from the same molded sample but were compiled from two separate moldings of each of the same runs.

Footnotes to TABLE III
[1] Isocyanate I: defined in footnote 1, TABLE I.
[2] Isocyanate IV: defined in footnote 4, TABLE I.
[3] The overhang was 6" as set forth in footnote 4 of TABLE II.

EXAMPLE 4

The following experiment sets forth a comparison of the preparation of two molded polyamide-polyurea-polyurethanes, run 13 in accordance with the present invention and comparison run 14 employing an enamine not in accordance with the present invention.

The same apparatus and procedure described in Example 1 was employed but the mold was fitted with a pressure transducer (Kistler Model 6153, Kistler Instrument Corp., Amherst, N.Y.) located in the mold's filling channel. The following formulation was employed at an index of 1.0 and with a hard segment content of

| Component A | |
|---|---|
| Isocyanate I | 64 parts |
| Isocyanate IV | 96 parts |
| Component B | |
| Fomrez A-1228 | 100 parts |
| DETDA | 67 parts |
| Enamine | at 0.0712 equivalents |
| UL-28 | 0.4 parts |

The enamine in Run 13 was 7.44 parts of the 1-(dibutylamino)cyclohexene-1 while run 14 had the equivalent amount of 5.45 parts of 1-(N-morpholino)-cyclopentene-1.

The pressure build-up was recorded over a 1.8 second period as the mold was filling by means of a Keithley/DAS Series 50 data acquisition system connected to an IBM PC (personal computer).

The results of the comparison in the pressure build-up between the two runs are set forth below.

| | Run 13 | Run 14 |
|---|---|---|
| Flow rate (g/s) | 221 | 225 |
| Temp. °F. of: | | |
| Component A | 100 | 99 |
| Component B | 120 | 125 |
| Mold | 128 | 123 |
| Mixed liquid components | 125 | 127 |
| Pressure (psi) at time (secs.) | | |
| 0.1 | 4.4 | 4.4 |
| 0.2 | 10.8 | 10.8 |
| 0.3 | 14 | 14 |
| 0.5 | 16.8 | 16.8 |
| 0.7 | 17.6 | 22 |
| 0.9 | 22.8 | 27.2 |
| 1.1 | 32.8 | 40 |
| 1.3 | 46.8 | 60 |
| 1.5 | 66.8 | 85.6 |
| 1.7 | 88 | 104.8 |
| 1.8 | 96.8 | 110 |

The pressure build-up parallels the reactivity of the systems and after 0.6 second the greater pressures in run 14 over run 13 shows clearly the much faster pressure build-up and thus faster reactivity of the latter over the former.

FORMULA CHART

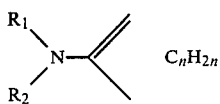 (I)

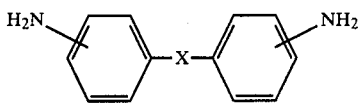 (II)

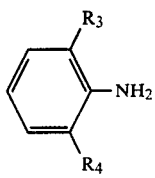 (III)

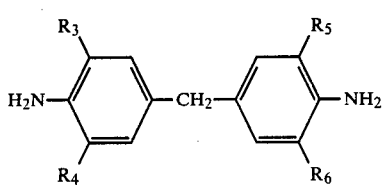 (IV)

REACTION CHART

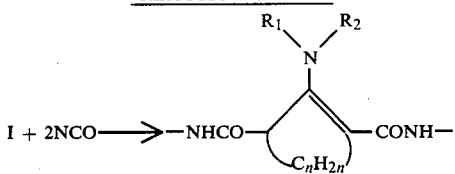

We claim:

1. A polyamide-polyurea containing polymer comprising the product of reaction injection molding of,
A. an organic polyisocyanate;
B. an organic compound having at least two active hydrogen containing groups and a M.W. of about 1500 to about 12,000; and C. from about 15 to about 160 parts per 100 parts of said (B) of a chain extender combination comprising
(i) an enamine having the formula

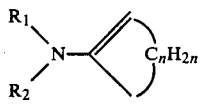

wherein $C_nH_{2n}$ represents alkylene having 3 carbon atoms in succession in the chain $R_1$ and $R_2$ when taken separately are independently selected from the group consisting of lower-alkyl, aralkyl, cycloalkyl, and, when taken together with the nitrogen atom to which they are attached, represent a heterocyclic group having from 5 to 7 ring atoms,
(ii) an aromatic diamine having a M.W. of about 108 to about 400 wherein (i) and (ii) are present in the proportions by weight based on their combined weight of about 5 to about 45 percent and 95 to 55 percent respectively and optionally,
(iii) about 5 to about 50 percent by weight of the total weight of (i), (ii), and (iii) of an extender diol of M.W. of about 60 to about 400;

wherein the ratio of equivalents of said polyisocyanate to total equivalents of (B) and (C) is within the range of about 0.90:1 to 1.10:1.

2. A polyamide-polyurea containing polymer according to claim 1 wherein said polyisocyanate is selected from the group consisting of (a) an isocyanate terminated prepolymer having an isocyanate content of about 9 to about 20 percent by weight and prepared from methylenebis(phenyl isocyanate); (b) a liquefied form of 4,4'-methylenebis(phenyl isocyanate), and mixtures of (a) and (b).

3. A polyamide-polyurea containing polymer according to claim 1 wherein said organic compound (B) comprises a polyol having a primary hydroxyl functionality of from about 2 to about 4.

4. A polyamide-polyurea containing polymer according to claim 1 wherein said organic compound (B) comprises a primary or secondary amine terminated polyether having an amine functionality of about 2 to about 4.

5. A polyamide-polyurea containing polymer according to claim 1 wherein $C_nH_{2n}$ in said enamine (i) represents the 1,3-propylene radical.

6. A polyamide-polyurea containing polymer according to claim 1 wherein $R_1$ and $R_2$ in said enamine each represent lower-alkyl.

7. A polyamide-polyurea containing polymer according to claim 1 wherein $R_1$ and $R_2$ in said enamine, taken together with the nitrogen atom to which they are attached represent a heterocyclic group having from 5 to 7 ring atoms.

8. A polyamide-polyurea containing polymer according to claim 1 wherein said enamine is 1-(dibutylamino)-cyclohexene-1.

9. A polyamide-polyurea containing polymer according to claim 1 wherein said enamine is 1-(N-piperidinyl)-cyclohexene-1.

10. A polyamide-polyurea containing polymer according to claim 1 wherein said aromatic diamine (ii) is selected from the group consisting of 1-methyl-3,5-diethyl-2,4-diaminobenzene, 1-methyl-3,5-diethyl-2,6-diaminobenzene, and mixtures thereof.

11. A polyamide-polyurea containing polymer according to claim 1 wherein an extender diol is present in about 5 to about 50 percent by weight of the total weight of the extender combination of (i), (ii), and (iii).

12. A polyamide-polyurea containing polymer according to claim 11 wherein said extender diol comprises ethylene glycol.

13. A polyamide-polyurea containing polymer prepared by reacting components A., B., and C. of claim 1 in the presence of a polyurethane catalyst.

14. A polyamide-polyurea containing polymer comprising the product of reaction injection molding of
A. a polyisocyanate selected from the group consisting of (a) an isocyanate terminated prepolymer having an isocyanate content of about 9 to about 20 percent by weight, and prepared from methylenebis(phenyl isocyanate), (b) a liquefied form of 4,4'-methylenebis(phenyl isocyanate), and mixtures of (a) and (b);
B. an organic polyol or polyamine having a M.W. of from about 1500 to about 12,000 and selected from the group consisting of polyols having a primary hydroxyl functionality of from about 2 to about 4, a primary or secondary amine terminated polyether having an amine functionality of about 2 to about 4, and mixtures of said polyol and polyamine; and C. from about 15 to about 160 parts per 100 parts of said (B) of a chain extender combination comprising
   (i) an enamine having the formula

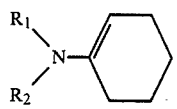

wherein $R_1$ and $R_2$ are each lower-alkyl,
   (ii) an aromatic diamine selected from the group consisting of 1-methyl-3,5-diethyl-2,4-diaminobenzene, 1-methyl-3,5-diethyl-2,6-diaminobenzene, and mixtures thereof wherein (i) and (ii) are present in the proportions by weight based on their combined weight of about 5 to about 45 percent and 95 to 55 percent, respectively, and optionally,
   (iii) about 5 to about 50 percent by weight of the total weight of (i), (ii), and (iii) of an extender diol of M.W. of about 60 to about 400; and optionally
D. a polyurethane catalyst wherein the ratio of equivalents of said polyisocyanate to total equivalents of (B) and (C) is within the range of about 0.90:1 to 1.10:1.

15. A polyamide-polyurea containing polymer according to claim 14 wherein said (B) comprises a polyol having a primary hydroxyl functionality of about 2 to about 3 and M.W. from about 2000 to about 8000.

16. A polyamide-polyurea containing polymer according to claim 14 wherein said (B) comprises a primary amine terminated polyether having an amine functionality of about 2 to about 3 and M.W. from about 2000 to about 6000.

17. A polyamide-polyurea containing polymer according to claim 14 wherein said enamine comprises 1-(dibutylamino)cyclohexene-1.

18. A polyamide-polyurea-polyurethane polymer according to claim 17 wherein said (A) comprises a liquefied form of 4,4'-methylenebis(phenyl isocyanate), said (B) comprises a polyoxyethylene-polyoxypropylene triol of M.W. of about 2000 to about 8000 and a polyurethane catalyst is employed.

19. A polyamide-polyurea-polyurethane polymer according to claim 17 wherein said (A) comprises a mixture of a liquefied form of 4,4'-methylenebis(phenyl isocyanate) and an isocyanate terminated prepolymer having an isocyanate content of about 9 to about 20 percent by weight and prepared from methylenebis(phenyl isocyanate), said (B) comprises a polyoxyethylene-polyoxypropylene triol of M.W. of about 2000 to about 8000, and a polyurethane catalyst is employed.

20. A polyamide-polyurea-polyurethane polymer according to claim 19 wherein said (C) comprises about 5 to about 50 percent by weight based on the total weight of (i), (ii), and (iii) of ethylene glycol, and a polyurethane catalyst is employed.

21. A polyamide-polyurea polymer according to claim 17 wherein said (A) comprises a mixture of a liquefied form of 4,4'-methylenebis(phenyl isocyanate) and an isocyanate terminated prepolymer having an isocyanate content of about 9 to about 20 percent by weight and prepared from methylenebis(phenyl isocyanate) and said (B) comprises a primary amine terminated polyether having an amine functionality of about 3 and M.W. of about 2000 to 6000.

* * * * *

UNITED STATES PATENT AND TRADEMARK OFFICE
CERTIFICATE OF CORRECTION

PATENT NO. : 4,552,945

DATED : November 12, 1985

INVENTOR(S) : Louis M. Alberino, Dale F. Regelman and Nancy P. Vespoli

It is certified that error appears in the above-identified patent and that said Letters Patent is hereby corrected as shown below:

Column 2, lines 17 and 18 "reaction of, of," should read -- reaction of, --.  Column 5, lines 17 and 18 "1,4-diisopropyl-2    5-diaminobenzene," should read -- 1,4-diisopropyl-2,5-diaminobenzene, --.  Column 8, line 11 "hardness heat resistance" should read -- hardness, heat resistance --; line 34 "application" should read -- application. --; line 54 "8" should read -- 18 --; line 57 "1hour" should read -- 1 hour --.  Column 13, line 51 after the word, of, (2nd occurr.) there should be inserted -- 63 percent. --.  Column 14, line 40 "DAS Series 50" should read -- DAS Series 500 --.  Column 15, FORMULA CHART, (I), lines 1-6:

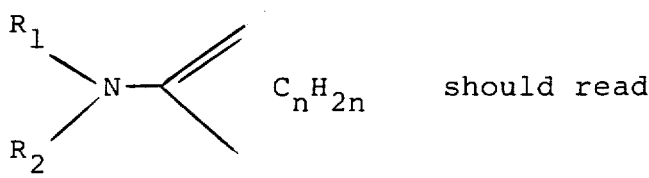   should read   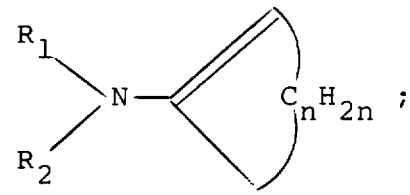

Claim 1, line 43 "C." should start on the next line.

Signed and Sealed this

Thirteenth Day of January, 1987

*Attest:*

DONALD J. QUIGG

*Attesting Officer*     *Commissioner of Patents and Trademarks*